United States Patent
Matthaei et al.

[15] 3,649,934
[45] Mar. 14, 1972

[54] QUASI-OPTICAL LOW-PASS ABSORPTION TYPE FILTERING SYSTEM

[72] Inventors: George L. Matthaei, Santa Barbara; David A. Leedom, Goleta, both of Calif.

[73] Assignee: The United States of America as represented by the Secretary of the Navy

[22] Filed: July 17, 1970

[21] Appl. No.: 55,797

[52] U.S. Cl. ..................... 333/73 R, 343/755, 343/756, 343/838, 343/834
[51] Int. Cl. ..................... H03h 7/02, H01q 19/06
[58] Field of Search ............... 333/73, 73 N; 343/753, 754, 343/911

[56] References Cited

UNITED STATES PATENTS

| | | | |
|---|---|---|---|
| 2,607,009 | 8/1952 | Affel | 343/754 |
| 2,736,894 | 2/1956 | Kock | 343/754 |
| 2,994,873 | 8/1961 | Gobau | 343/754 |
| 3,451,014 | 6/1969 | Brosnahau | 333/73 W |

Primary Examiner—Herman Karl Saalbach
Assistant Examiner—C. Baraff
Attorney—Richard S. Sciascia and Paul N. Critchlow

[57] ABSTRACT

Microwaves including millimeter waves and possibly infrared systems are filtered by reflectively focusing and refocusing input electromagnetic waves between sets of parallel metal plates the end portions of which are curved to form the respective mirror surfaces. The individual plates are spaced one from the other a distance equal to about one half wavelength or less in the low-pass band and the spacing between plates is filled with an absorbent material (in the regions away from the plate edges). Filtering is achieved by absorbing wavelengths of frequencies higher than the pass band in the absorbing material.

5 Claims, 3 Drawing Figures

OUTPUT SIGNAL    INPUT SIGNAL

QUASI-OPTICAL LOW-PASS ABSORPTION TYPE FILTERING SYSTEM

The invention described herein may be manufactured and used by or for the Government of the United States of America for governmental purposes without the payment of any royalties thereon or therefor.

BACKGROUND OF THE INVENTION

The present invention relates to microwave filters and, in particular, to filters for use in wave propagation systems employing quasi-optical propagation.

There has been an increasing interest in microwave and millimeter wave systems which use quasi-optical propagation with the energy being channeled by focused-beam transmission lines or by oversized waveguides both of which permit high power carrying capability and low transmission losses. One example of such a system is the lens beam waveguide which employs a series of dielectric lenses each having a particular focal length with the lenses separated a precise distance that is a function of the focal length. As compared with conventional waveguides, these systems have a number of advantages one being that their physical dimensions can be relatively large whereas a conventional waveguide system has transverse dimensions in the order of one half a wavelength. At millimeter wave frequencies or higher a half wavelength is very small and a conventional waveguide becomes difficult to make. Also, it can carry relatively little power and it has high attenuation. By contrast, the power handling capability of the beam waveguides when applied to millimeter and submillimeter waves is much higher and the attenuation much lower.

Another type of quasi-optical system is the reflecting beam waveguide which while possessing the same advantages as the lens beam waveguides, also avoids some of the problems found in the lens beam systems. Thus, the dielectric material of the lenses has significant dielectric loss while a focusing mirror system has appreciably less loss. Consequently, even though a lens beam waveguide system has much less loss than a conventional type of waveguide system, a reflecting beam waveguide system will have even less loss.

Such reflecting beam waveguide structures have been described in the literature and, in particular, in an article entitled "The Reflecting Beam Wavguide" authored by Degenford, Sirkis and Steier, this article appearing in IEEE Transactions on Microwave Theory and Techniques, Vol. MTT-12, pp. 445-453, July 1964. As will be found, the present invention is in some ways closely related to the reflecting beam waveguide structure described in that article. Thus, for example, the waveguide structure described in the article channels electromagnetic energy by focusing and refocusing it along a zig-zag path by a series of focusing mirrors. However, one fundamental difference is present in that, although the present invention also employs a focusing mirror system, the mirrors of the present system are formed from the edges of an array of parallel metal plates instead of by a smooth surface. Also, in the present system the E field must be polarized parallel to the plates.

It further is to be noted that the system described in the article is a waveguide structure employed simply for energy transmission purposes while, as has been previously indicated, the present invention primarily is concerned with a filtering system for absorptively removing frequency components above a certain cutoff frequency, the filtering permitting the transmission of a desired lower-frequency pass band. Most filters previously used for quasi-optical applications have been of a kind which attenuate in their stop-bands by reflecting the energy and, as regards such systems, the reflecting technique has in some instances been found to produce undesirable interaction effects between the filter and the rest of the system. Further, the present system appears to have a large stop-band width and to be unaffected by the presence of higher-order modes.

There are, of course, waveguide filters which employ absorbing structures for removing spurious wave energies, the absorptive structure elements being coupled to a main waveguide through suitably chosen apertures and the choice of the apertures being such that the fundamental frequencies of the waveguide are freely transmitted with the harmonics dissipated by absorption. However, such systems do not channel the energy by quasi-optical techniques and thus are subject to the problems associated with conventional waveguides particularly when used as practical transmission systems for millimeter and submillimeter waves.

THE OBJECTS OF THE INVENTION

It is therefore an object of the present invention to provide a quasi-optical microwave filtering system having a frequency selective capability provided by an absorptive structure.

A related object is to provide a quasi-optical filtering system employing reflecting beam waveguide techniques.

Another object is to provide a quasi-optical filtering system having a relatively large stop-band width that is relatively unaffected by the presence of higher-order modes.

Yet another object is to provide a quasi-optical system for filtering millimeter and submillimeter waves, the system having a relatively high power handling capability and relatively low attenuation.

These and other objects are achieved by employing a plurality of reflecting mirrors curved to focus input wave energy so as to transmit the fundamental frequencies of this input energy along a zig-zag path. Preferably, the mirrors are formed by the end portions of a plurality of parallel plates. Absorptive material is disposed in the spacing between the plates and the plates themselves spaced so that, in the pass band of the system, the distance between the plates is less than a half wavelength to cause the energy in the pass band to be reflected and focused so as to travel in the zig-zag path. Where the spacing between the metal plates is greater than a half wavelength, the energy in these shorter wavelengths of the higher frequencies no longer is reflected and instead is transmitted between the plates and absorbed by the absorptive material. Means, such as two metal ground planes, are provided above and below the mirror system to provide appropriate boundary conditions for polarizing the electrical field so that this electrical field is parallel to the plates. Means also are provided for launching the input energy into the filtering system in a form close to the mode propagated by the system thus avoiding unwanted resonances in the pass band due to trapped modes and minimizing diffraction loss.

BRIEF DESCRIPTION OF THE DRAWINGS

The present invention is illustrated in the accompanying drawings of which.

DETAILED DESCRIPTION OF THE INVENTION

Figure 1:
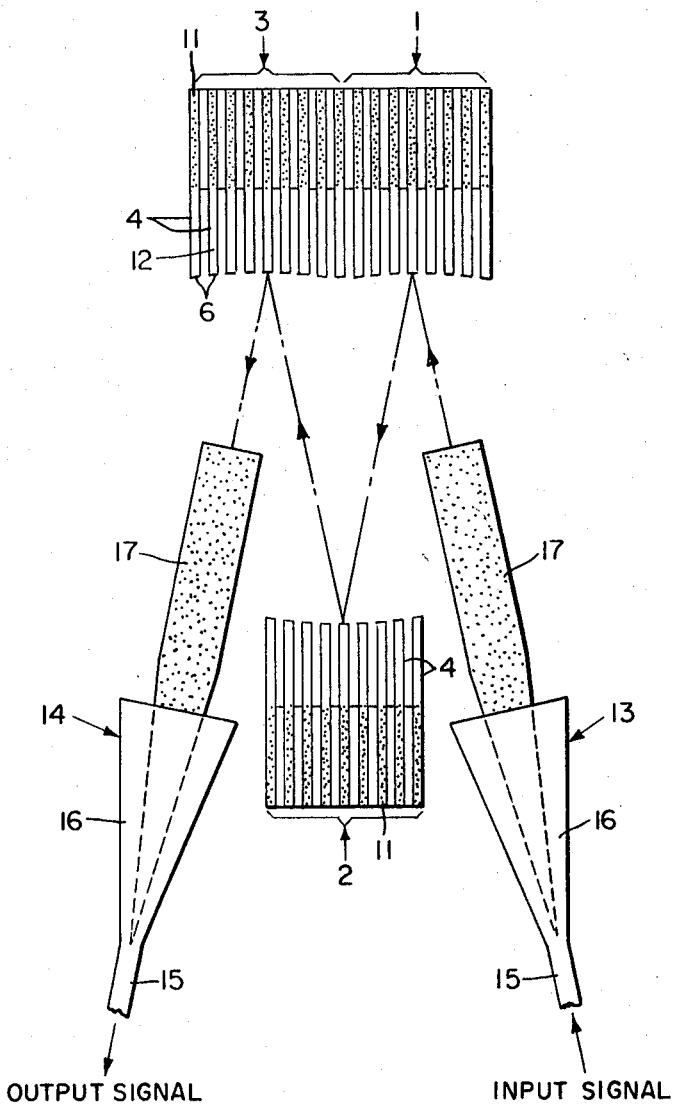
FIG. 1 is a plan view diagrammatically showing a trial three-reflector arrangement using a modified antenna horn as a launcher.
Figure 2:
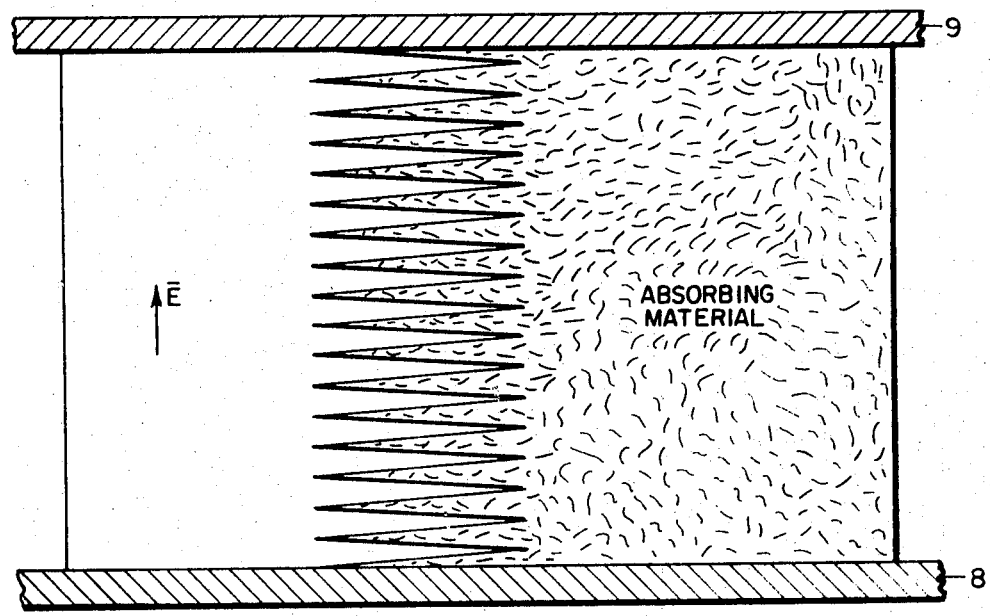
FIG. 2 is a side view of one of the mirror systems showing a particular configuration of the absorptive material within the reflectors.

Before describing the structure as shown in the drawings, it should be noted that the drawings simply illustrate a trial three-reflector design used to test the principles upon which the present invention is based. It is expected that commercially practical designs would involve more sophisticated fabrication procedures which, as will be appreciated, are well within the skill of the art. Referring to FIG. 1 of the drawings, the trial design employed three so-called mirror systems generally identified by numerals 1, 2 and 3, each of these systems including a plurality of metal plates 4 and each of the plates having an end portion 6 curved to cooperatively provide a mirror surface for reflecting electromagnetic wave energy from one mirror system to the next along the path shown in the drawing. It is particularly pertinent to note that the E field of the system as a whole is polarized vertically out of the paper in FIG. 1 and, for this purpose, two metal ground planes 8 and 9 (FIG. 2) can be employed above and below the mirror systems to provide in the usual manner the appropriate boundary conditions for the vertical polarization. The curvature of the mirror faces or surfaces 6 also is important for effective operation although it does not constitute a part of the intended novelty of the present invention. Thus, for example, the mirror-face curvature of the illustrated trial reflector was designed in accordance with presently available theory provided in the previously identified paper published by Degenford, Sirkis and Steier, as well as in another publication by Boyd and Kogelnik "Generalized Confocal Resonator Theory" BSTJ, Vol. 41, pp. 1,347–1,369 of July 1962.

Referring again to FIG. 1, it is to be noted that plates 4 of the mirror systems are parallel one to the other and further that the plates are spaced a particular distance one from the other. Thus, plates 4 are disposed in such a manner as to be essentially parallel to the vertically polarized E field and, as has been indicated, this disposition provides one of the unique features of the present invention.

Another important feature is that the filtering or attenuation of the present system is achieved by the use of absorptive means and, as shown, this means is provided by absorbers 11 which can be made of pine wood or the like provided at their front ends with a sawtooth configuration (FIG. 2), this configuration providing an improved impedance matching in the manner known to the art. The region between plates 4 in front of absorbers 11 is filled with polyfoam represented by numeral 12. The absorptive material is purposefully removed from the mirror edges of the reflecting plates to prevent attenuation of the incident waves in the frequency range where the plates are serving as a reflector. In the trial reflector design the entire arrangement of the plates, absorbers and polyfoam was constructed by wrapping the polyfoam and the absorber pieces with aluminum foil. As has been indicated, other fabrication procedures probably would be employed in practical designs.

An important problem is designing a system of the type shown in FIG. 1 lies in the proper launching of the electromagnetic waves into the system as well as the recovery of the waves from the system. For example, the previously cited reference of Boyd and Kogelnik as well as the publication of Degenford et al. demonstrate that at the midplane between reflectors the beam shape should be approximately Gaussian. The illustrated trial design essentially achieved this characteristic by using particular dielectric mode launchers 13 and 14, these launchers including a rectangular-aperture commercial, horn antenna 16 and a shaped body of dielectric material 17 inserted into each of the horns. Using a dielectric material with a relative dielectric constant of approximately 1.1, measurements showed that the E field strength in the dielectric material and the surrounding air, as compared with a Gaussian characteristic, was reasonably good. However, it has been appreciated that the trial design could be improved by using more than one dielectric material to obtain a better match between the fields of the mode launching device and the lowest-order-mode field configuration generated by the reflecting mirrors. A good match is important to achieve a low launching loss and avoid unwanted resonances in the pass band due to trapped modes. Such trapped modes can occur when higher-order modes which cannot propagate in the end parts of the system are excited in the middle of the system. The higher-order trapped modes have an effect on the system like band-stop resonators and tend to cause attenuation spikes in the pass band.

Frequency selectivity of the filter is provided by using absorbers 11 and polyfoam supports 12 to space plates 4 a particular distance one from the other. Specifically, the spacing should be such that the distance between plates is less than a half wavelength in the pass band of the system. Consequently, as indicated by the dashed arrows in FIG. 1, the energy in the pass band is reflected and focused as to travel a zig-zag path from one mirror system to the next. However, at higher frequencies where the spacing between the metal plates become greater than a half wavelength, the energy no longer is reflected at the mirror faces and much of the incident energy is transmitted between the plates and absorbed by the absorbing material.

Figure 3:
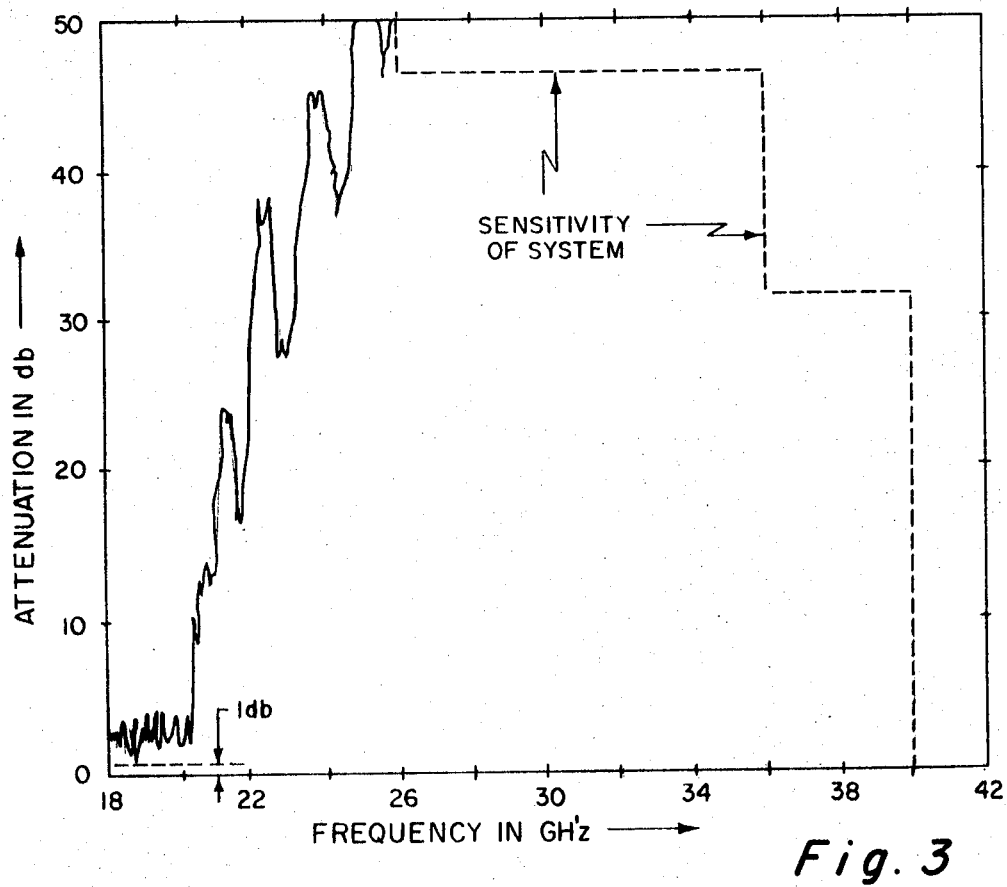
FIG. 3 is a plot showing the measured attenuation characteristic of the trial three-reflector filter.

The attenuation characteristic of the trial three-reflector design is illustrated in FIG. 3. Although the plot of FIG. 3 does show many attenuation spikes due to trapped modes in the pass band, it is to be particularly noted that the minimum attenuation points in the pass band were about 1 db, indicating that the basic pass band loss of this structure is quite low. It is predicted that by using horns with a longer taper, it should be possible to reduce the pass band trapped mode spikes to a considerable extent. Of course, if the filter is terminated in oversized waveguides, only dielectric inserts would be required to make mode launchers.

The stop-band appears quite clean and free of spurious responses. The peaks of attenuation in this cutoff region are believed to be due to mismatch and resonant effects between the leading edge of the reflectors and the absorbing loads between the plates. These effects are actually beneficial since they increase the stop-band attenuation beyond that which theory predicts for a three-reflector system. Although equipment was not available to measure the stop-band at higher frequencies, it appears that the stop-band should be strong up to much higher frequencies and this indication is illustrated by the dashed sensitivity line of FIG. 3.

In summation, it has been demonstrated that a filtering system designed in accordance with the previously described principles, provides a system which has the advantages of reflecting beam waveguides and, in addition, possesses other advantages inherent in utilizing an absorptive-type stop-band attenuation. The system appears to possess a high power handling capability of particular interest for use in the region of millimeter and submillimeter waves and the attenuation is quite low. Also, as compared with reflective-type stop-band attenuation, the present system provides a relatively large stop-band width and it appears that the stop-band is relatively unaffected by the presence of higher-order modes.

Obviously many modifications and variations of the present invention are possible in the light of the above teachings. It is therefore to be understood that within the scope of the appended claims the invention may be practiced otherwise than as specifically described.

What is claimed is:

1. A low-pass quasi-optical filter system for filtering and transmitting input electromagnetic wave energy, the system comprising:
    a plurality of spaced parallel plates having metallic end portions spaced one from the other a distance of about a half wavelength at the cutoff frequency, said end portions being curved for reflectively focusing said input energy,
    absorptive material disposed in the spacing between the plates,
    means for polarizing the E field of the system parallel to said plates,
    launching means for said input energy, and
    means for receiving said reflectively focused input energy,
    whereby said input energy for frequencies in the pass band of the system is reflectively transmitted in a zigzag path with frequencies higher than the pass band being absorbed in said absorptive material.

2. The system of claim 1 wherein a plurality of sets of three spaced parallel plates are provided, said nets being disposed for focusing and refocusing said input energy to reflectively channel said energy in a zigzag path defined by successive sets of plates.

3. The system of claim 2 wherein said launching means is formed to minimize trapped mode activity in the pass band. activity 4. The system of claim 3 further including means for receiving the focused output of said system, said output means also being formed to minimize trapped mode actiity in the pass band.

5. The system of claim 4 wherein said launching and output means both include a horn antenna and a shaped body of a dielectric material carried by each of the horns, said shaping as well as the dielectric material being selected for minimizing said trapped modes.

* * * * *